(12) United States Patent
Tsukui

(10) Patent No.: US 6,892,696 B2
(45) Date of Patent: May 17, 2005

(54) INTERNAL COMBUSTION ENGINE

(75) Inventor: Takaaki Tsukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/782,757

(22) Filed: Feb. 23, 2004

(65) Prior Publication Data

US 2004/0182362 A1 Sep. 23, 2004

(30) Foreign Application Priority Data

Feb. 24, 2003 (JP) ........................................ 2003-045700

(51) Int. Cl.[7] .............................................. F02B 31/08
(52) U.S. Cl. ...................................... 123/308; 123/90.4
(58) Field of Search .......................... 123/90.15–90.18, 123/90.27, 308, 432

(56) References Cited

U.S. PATENT DOCUMENTS

| | | | | |
|---|---|---|---|---|
| 4,635,592 A | * | 1/1987 | Weichsler .................... | 123/308 |
| 4,671,233 A | * | 6/1987 | Iwashita et al. ............ | 123/308 |
| 5,081,971 A | * | 1/1992 | Inoue et al. ................ | 123/432 |
| 5,095,859 A | * | 3/1992 | Iwata et al. ............... | 123/90.27 |
| 5,291,868 A | * | 3/1994 | Nonogawa et al. ......... | 123/432 |
| 5,638,783 A | * | 6/1997 | Regueiro .................. | 123/90.22 |
| 5,685,265 A | * | 11/1997 | Yoshikawa ............... | 123/90.27 |
| 5,921,210 A | * | 7/1999 | Regueiro .................. | 123/90.22 |
| 5,988,128 A | * | 11/1999 | Moriya et al. ............ | 123/90.18 |
| 6,170,449 B1 | * | 1/2001 | Saiki et al. .............. | 123/90.22 |

FOREIGN PATENT DOCUMENTS

| | | |
|---|---|---|
| JP | 11-50852 A | 2/1999 |
| JP | 2000-205038 A | 7/2000 |

* cited by examiner

*Primary Examiner*—Erick Solis
(74) *Attorney, Agent, or Firm*—Birch, Stewart, Kolasch & Birch, LLP

(57) ABSTRACT

To provide an internal combustion engine that can generate a strong swirl by increasing the amount of intake air for generating the swirl in a simple structure. In the internal combustion engine provided with a cylinder head formed with an air intake port having first and second ports, when a second intake valve for opening and closing the second port is brought into a halted state by a valve halting mechanism, a swirl is generated by intake air flowing through the first port in a combustion chamber. At a first inlet slot, the line of intersection between a first plane, which is a plan including the first inlet slot and a first orthogonal plane inclines upwardly as it approaches from the position near the outer periphery of the combustion chamber towards a second reference plane, and the first port includes a port section having a passage shape which extends substantially along a perpendicular line orthogonal to a first plane from the first inlet slot towards the upstream by a predetermined length of the passage in a plan view.

19 Claims, 4 Drawing Sheets

INTERNAL COMBUSTION ENGINE

CROSS-REFERENCE TO RELATED APPLICATIONS

The present application claims priority under 35 USC 119 to Japanese Patent Application No. 2003-045700 filed on Feb. 24, 2003 the entire contents thereof is hereby incorporated by reference.

BACKGROUND OF THE INVENTION

1. Field of the Invention

The present invention relates to an internal combustion engine including a cylinder head formed with an air intake port having first and second ports including first and second inlet slots opening into a combustion chamber, respectively, wherein a swirl is generated by intake air flowing through the first port.

2. Description of Background Art

An example of an internal combustion engine is disclosed in JP-A-11-50852 in which a swirl is generated in a combustion chamber during an intake stroke in order to improve a combustibility of the lean air-fuel mixture. In this internal combustion engine, a cylinder head is formed with first and second intake ports which communicate respectively with first and second inlet slots opening into the combustion chamber. In addition, first and second intake valves are provided which are driven by a valve mechanism and open and close the first and the second intake ports, respectively. Since the valve mechanism halts the second intake valve and opens and closes only the first intake valve when the internal combustion engine is at a low load, a swirl is generated in the combustion chamber by intake air flowing from the first inlet slot into the combustion chamber. A valve halting mechanism for halting the intake valve is disclosed in JP-A-2000-205038.

In the internal combustion engine disclosed in JP-A-11-50852, a pair of inclined roof surfaces are formed on the bottom of the cylinder head, which defines the upper surface of the combustion chamber. The first and the second inlet slots open on one of the roof surfaces aligned in the direction of the rotational centerline of a camshaft. The axes of valve stems of the first and the second intake valves extend in parallel with each other so as to be orthogonal to the rotational centerline described above. Therefore, the axes of the valve stems of the first and the second intake valves extends in parallel with a second reference plane which includes the axis of the cylinder in a plan view and extends orthogonally to the rotational centerline described above. Therefore, the first inlet slot is included in one of the roof surfaces, wherein the level does not change even when it approaches from the outer peripheral side of the combustion chamber toward the reference plane, in the direction of the rotational centerline. In general, the line of intersection of the plane including the first inlet slot and the plane parallel with a first reference plane which includes the axis of the cylinder and extends in parallel with the rotational centerline described above is in parallel with a third reference plane. Consequently, the length of the line of intersection between the points of intersection with respect to the outline corresponding to the outer periphery of the combustion chamber projecting onto the first plane in the direction of the cylinder axis is smaller than in the case in which the line of intersection does not extend in parallel with the third reference plane. Therefore, there is not enough space for increasing the diameter of the first inlet slot on the combustion chamber having a predetermined diameter. Thus, it is difficult to increase the amount of intake air for generating the swirl by increasing the area of the first inlet slot so as to generate a strong swirl.

SUMMARY AND OBJECTS OF THE INVENTION

In view of such circumstances, it is an object of the present invention to provide an internal combustion engine which can generate a strong swirl by increasing the amount of intake air for generating the swirl in a simple structure.

The present invention provides an internal combustion engine including a cylinder in which a piston is reciprocatably fitted. A cylinder head is formed with an intake port having a first port and a second port including respectively a first inlet slot and a second inlet slot opening into a combustion chamber. A valve mechanism is provided for opening and closing a first intake valve and a second intake valve for opening and closing the first port and the second port, respectively. Intake air control means are provided for generating a swirl in the combustion chamber by intake air flowing from the first port. Wherein a straight line orthogonal to a first plane, which is a plane including the first inlet slot, is assumed to be a perpendicular line and a plane including a cylinder axis and extending in parallel with the rotational centerline of a camshaft provided with a valve motion cam for opening and closing the first intake valve is assumed to be a first reference plane. In addition, a plane including the cylinder axis and extending orthogonally to the rotational centerline is assumed to be a second reference plane and a plane extending in parallel with the first reference plan is assumed to be a first orthogonal plane. The line of intersection between the first plane and the first orthogonal plane inclines upwardly as it approaches from the position near the outer periphery of the combustion chamber towards the second reference plane at the first inlet slot, and the first port includes a port section having a passage shape which extends substantially along the perpendicular line from the first inlet slot toward the upstream by a predetermined length of the passage in plan view.

Accordingly, the first plane including the first inlet slot defines a bevel inclining upwardly as it approaches from the position near the outer periphery of the combustion chamber toward the second reference plane in the direction of the rotational centerline. In addition, the line of intersection is not parallel with the third reference plane, which is a plane extending orthogonally to the cylinder axis. Therefore, the diameter of the first inlet slot in the direction of the rotational centerline can be increased so that the opening area is increased in comparison with the related art in which the line of intersection between the plane including the inlet slot through which intake air for generating the swirl flows in and the plane extending in parallel with the first reference plane extends in parallel with the third reference plane. In addition, since the port section of the first port is the passage extending in the direction orthogonal to the first inlet slot in a plan view, the width of the passage in a plan view, which is a factor for determining the cross-sectional area at the port section extending from the first inlet slot to the upstream (the area of the passage along a plane orthogonal to the streamline of intake air) can be maximized.

As a consequence, according to the present invention, the following effects are achieved. In the first inlet slot, the opening area of the first inlet slot can be increased and the width of the port section in a plan view can be maximized to increase the cross-sectional area of the passage in a simple structure in which the line of intersection between the first plane and the first orthogonal plane inclines as it approaches from the position near the outer periphery of the combustion chamber toward the second reference plane, and the first port includes the port section having a passage shape extending from the first inlet slot to the upstream substantially along the perpendicular line in a plan view. Therefore, when the intake air control means generates a swirl in the combustion chamber by intake air flowing from the first port, the amount of intake air for generating the swirl flowing into the combustion chamber from the first inlet slot can be increased, and thus a strong swirl can be generated. Consequently, the combustibility of the lean combustion is further improved, which enables combustion with a leaner air-fuel mixture, and thus fuel consumption is decreased. In addition, since squeezing of intake air flowing into the combustion chamber when generating the swirl may be avoided irrespective of generating a strong swirl, the pumping loss may be reduced, which also contributes to a reduction in fuel consumption.

The present invention provides an internal combustion engine including a cylinder in which a piston is reciprocatably fitted. A cylinder head is formed with an intake port having a first port and a second port including, respectively, a first inlet slot and a second inlet slot opening into a combustion chamber. A valve mechanism is provided for opening and closing a first intake valve and a second intake valve, respectively, for opening and closing the first inlet slot and the second inlet slot and for halting the second intake vale in the specified operating range. The first intake valve is formed of a poppet valve disposed so as to gradually approach a reference plane which includes a cylinder axis and extends orthogonally to the rotational centerline of a camshaft on which a valve motion cam for opening and closing the first intake valve is provided as the axis of a valve stem approaches from the side of the distal end of the valve stem to the side of the bevel portion of the first intake valve as viewed in a plan view. In addition, the first port includes a port section having a passage shape extending substantially along the axis of the valve stem in a plan view from the first inlet slot toward the upstream by a predetermined passage length.

Accordingly, the first inlet slot is opened and closed by the first intake valve which is formed of the poppet valve and is included in the beveled plane inclining upwardly as it approaches from the position near the outer periphery of the combustion chamber toward the reference plane. Thus, the diameter of the first inlet slot in the direction of the rotational centerline may be increased to increase the opening area in comparison with the related art in which the inlet slot through which intake air for generating a swirl that is flowing in is not changed in level in the direction of the rotational centerline. In addition, since the port section of the first port is a passage extending in the direction substantially orthogonal to the first inlet slot in a plan view, the width of the passage in a plan view, which is a factor for determining the cross-sectional area at the port section extending from the first inlet slot to the upstream (the area of the passage along a plane orthogonal to the streamline of intake air) can be maximized.

Consequently, according to the present invention, since the first intake valve is disposed so as to gradually approach the reference plane as the axis of the valve stem approaches the side of the distal end of the valve stem toward the side of the bevel portion of the intake valve in a plan view, and the first port includes the port section having a passage shape extending substantially along the axis of the valve stem from the first inlet slot to the upstream by a predetermined passage length in plan view, in the internal combustion engine including the valve mechanism having a valve halting mechanism for opening and closing the first intake valve formed of the poppet valve and halting the second intake valve in the specific operating range, the amount of intake air for generating the swirl flowing into the combustion chamber from the first inlet slot can be increased when the valve halting mechanism halts the second intake valve.

The term "upward" represents, in the direction of the cylinder axis, the direction in which the top dead center of the piston is located with respect to the bottom dead center thereof unless otherwise specified. The radial direction represents the direction of radiation about the cylinder axis, and the term "plan view" means the view in the direction of the cylinder axis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to FIG. 1 to FIG. 4, an embodiment of the present invention will be described.

Figure 1:
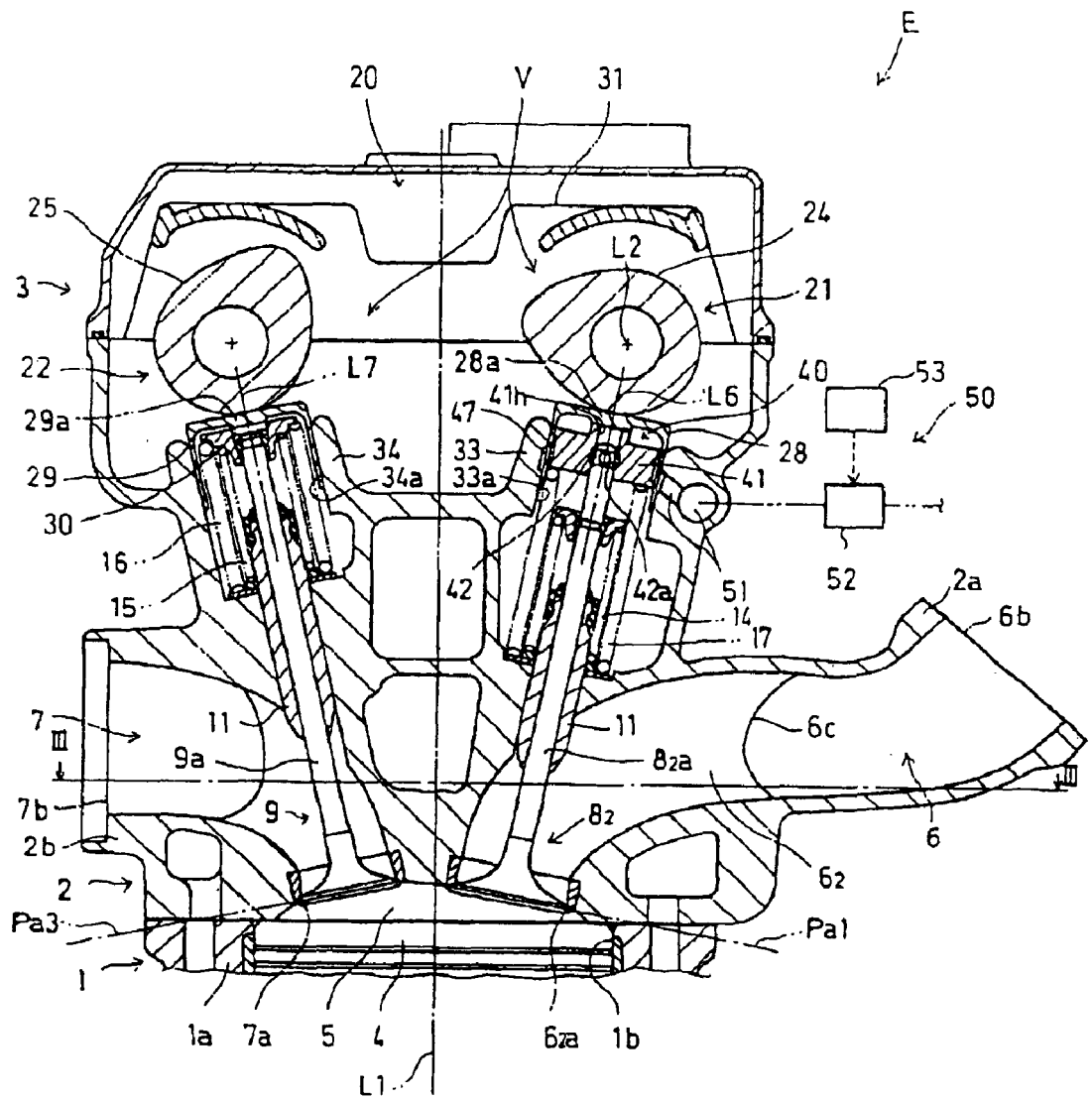
FIG. 1 is a cross-sectional view taken along axes of valve stems of an intake valve and an exhaust valve of an internal combustion engine, and taken substantially along the line I—I in FIG. 3.
Figure 2:
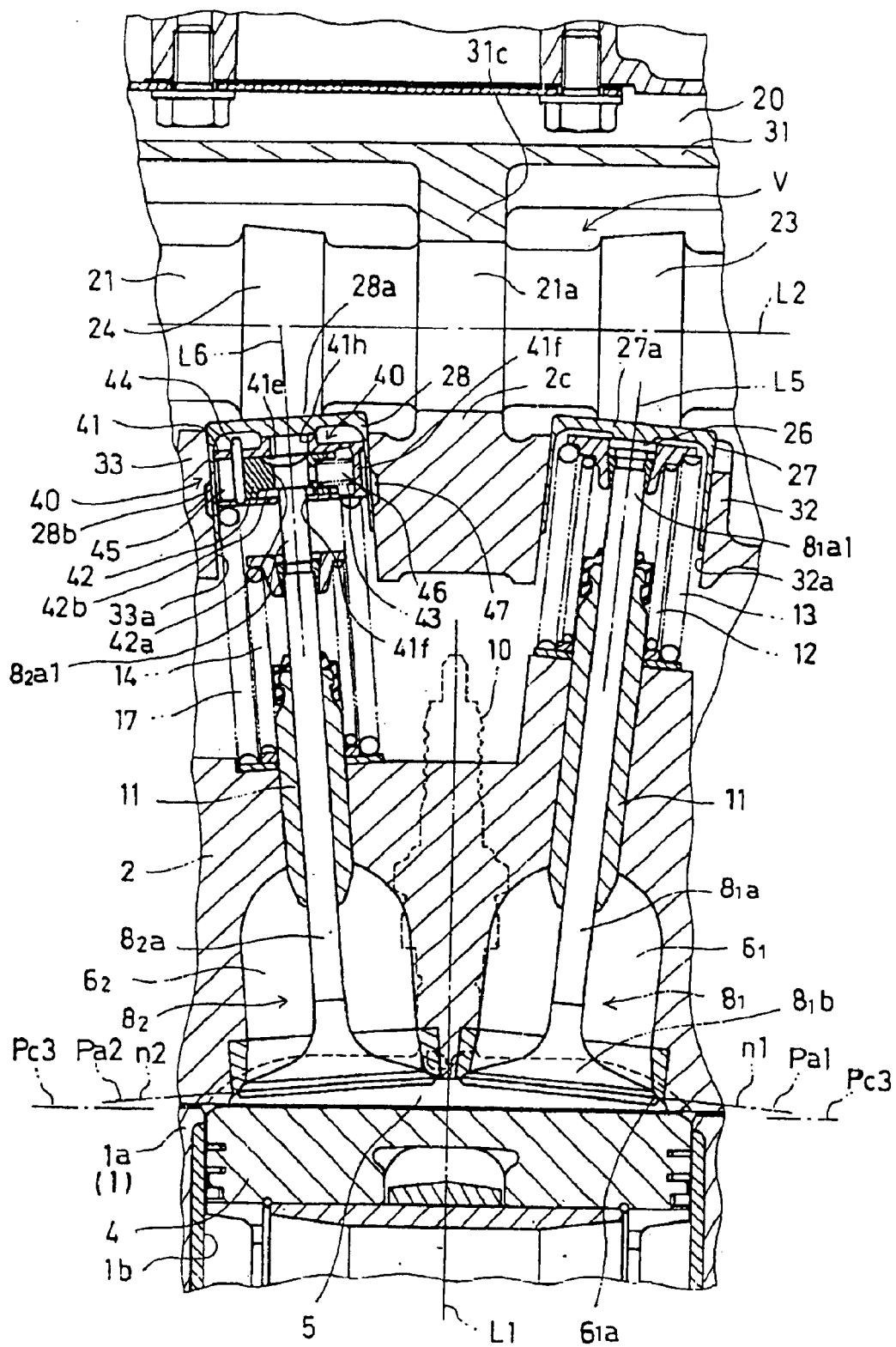
FIG. 2 is a cross-sectional view taken along the axes of the valve stems of two intake valves of the internal combustion engine and taken substantially along the line II—II in FIG. 3.
Figure 3:
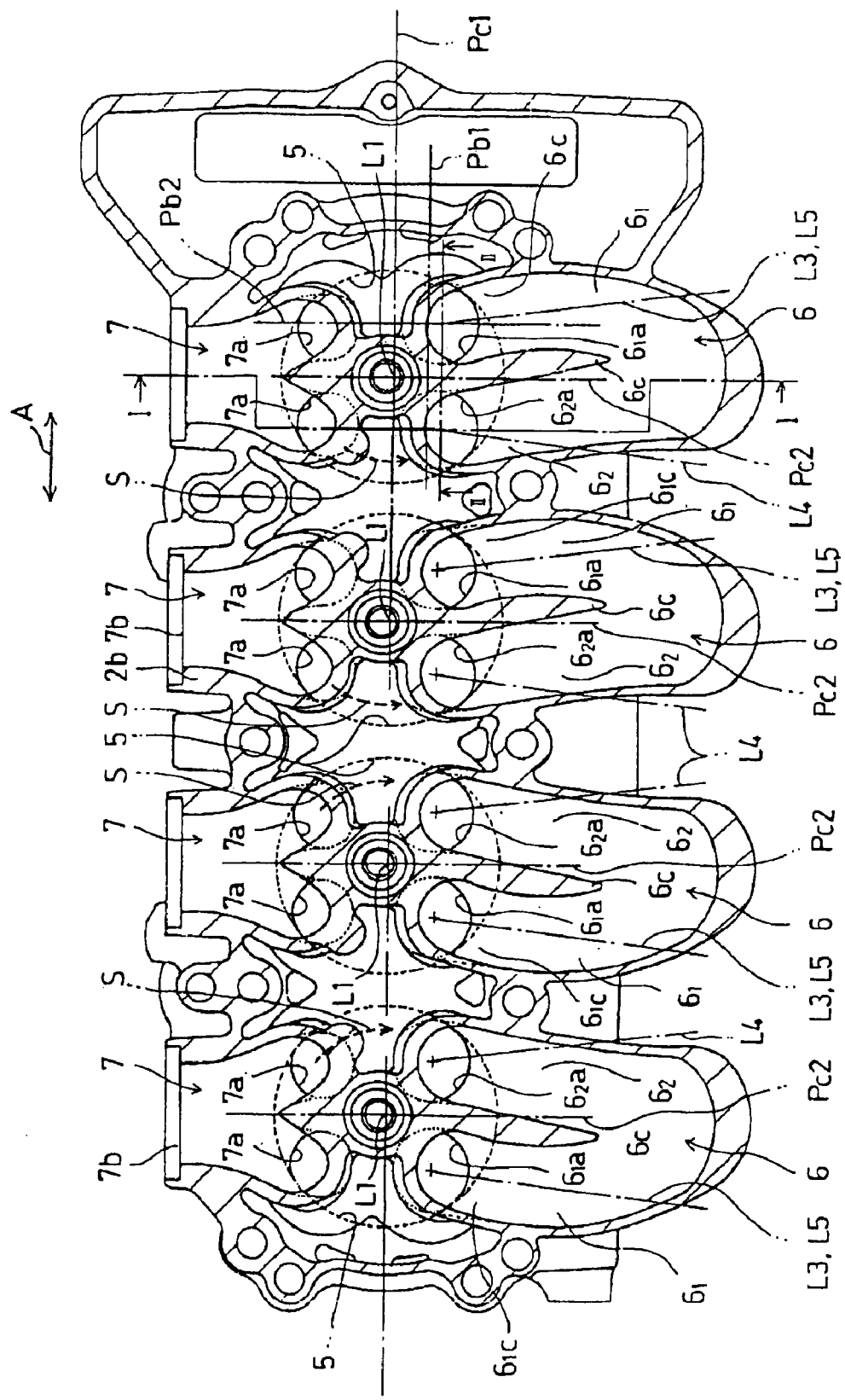
FIG. 3 is a cross-sectional view of a cylinder head taken along the line III—III in FIG. 1.

In FIGS. 1 to FIG. 3, an internal combustion engine E to which the present invention is applied is a DOHC in-line 4-cylinder, 4-stroke internal combustion engine to be mounted to a motorcycle, which burns with a lean air-fuel mixture. In FIG. 1 and FIG. 2, the internal combustion engine E includes a cylinder block 1 to the lower end of which a crankcase is connected, a cylinder head 2 to be connected to the upper end of the cylinder block 1, and a head cover 3 to be connected to the upper end of the cylinder head 2.

Pistons 4 fit into cylinder bores 1b for four cylinders 1a formed in the cylinder block 1 so as to be capable of a reciprocating motion. Each piston 4 is connected to a crankshaft rotatably supported by the crankcase via a connecting rod that rotates the crankshaft.

For each cylinder 1a, the cylinder head 2 is formed with a recess on the lower surface thereof at the position opposing the cylinder bore 1b in the direction of a cylinder axis L1. A combustion chamber 5 is defined between the recess and the top of the piston 4. In addition, for each combustion chamber 5, the cylinder head 2 includes an air intake port 6 having first and second inlet slots $6_1a$, $6_2a$ opening into the combustion chamber 5 with an exhaust port 7 having a pair of exhaust slots 7a opening into the combustion chamber 5. First and second intake valves $8_1$, $8_2$ are provided for opening and closing the first and the second inlet slots $6_1a$, $6_2a$, respectively, with a pair of exhaust valves 9 for opening and closing the pair of exhaust slots 7a, respectively, by being opened and closed by a valve mechanism V, which will be described later. An ignition plug 10 for igniting an air-fuel mixture in the combustion chamber 5 is screwed into and fixed to the cylinder head 2, and is directed to the center of the combustion chamber 5 at the position intersecting with the cylinder axis L1, which corresponds to the center of each combustion chamber 5.

In each combustion chamber 5, the first and the second inlet slots $6_1a$, $6_2a$ are provided in juxtaposition in the direction A of the rotational centerline L2 (hereinafter referred to as the "direction of rotational centerline A") on the air intake side, which is one side of a first reference plane Pc1 (See FIG. 3) including the cylinder axis L1 and extend in parallel with the rotational centerline L2 of an intake camshaft 21, that will be described later. The pair of exhaust slots 7a is provided in juxtaposition in the direction of the rotational centerline A on the exhaust side, which is the other side of the first reference plane Pc1.

Connected to a side wall 2a of the cylinder head 2 on the air intake side toward which an entrance 6b of the respective air intake port 6 opens are a suction system (not shown) including a fuel injection valve, which serves as a fuel supply unit for supplying fuel to intake air and an intake manifold for guiding intake air to the respective air intake port 6. Connected to a side wall 2b on the exhaust side of the cylinder head 2 to which an exhaust slot 7b of the respective exhaust port 7 opens is an exhaust system (not shown) for discharging combustion gas discharged from the combustion chamber 5 to the exhaust port 7 outside the internal combustion engine E.

Referring to FIG. 1 to FIG. 3, each air intake port 6 includes first and second ports $6_1$, $6_2$ formed independently from each other by being partitioned by a bulkhead c positioned downstream of the entrance 6b (See FIG. 1) in the direction of suction of air, and the first and the second ports $6_1$, $6_2$ includes, respectively, the first and the second inlet slots $6_1a$, $6_2a$. The first inlet slot $6_1a$ is formed on a first plane Pa1 which is in contact with the peripheral edge thereof along the entire circumference (See FIG. 1 and FIG. 2). In the same manner, the second inlet slot $6_2a$ is formed on a second plane Pa2 which is in contact with the peripheral edge thereof along the entire circumference (See FIG. 2).

In FIG. 3, when a plane including the cylinder axis L1 and intersecting the rotational centerline L2 is assumed to be a second reference plane Pc2, a plane in parallel with the first reference plane Pc1 is assumed to be a first orthogonal plane Pb1 (an example is shown in FIG. 3), and a plane extending orthogonally to the first reference plane Pc1 and extending in parallel with the second reference plane Pc2 is assumed to be a second orthogonal plane Pb2 (an example is shown in FIG. 3). The line of intersection between the first plane Pa1 and the second orthogonal plane Pb2 inclines upwardly as it approaches from the position near the outer periphery of the combustion chamber 5 toward the first reference plane Pc1, and the line of intersection n1 between the first plane Pa1 and the first orthogonal plane Pb1 (see FIG. 2) inclines upwardly as it approaches from the position near the outer periphery of the combustion chamber 5 to the second reference plane Pc2 at the first inlet slot $6_1a$. Therefore, the line of intersection n1 does not extend in parallel with a third reference plane Pc3 (an example is shown in FIG. 2), which is a plane orthogonal to the cylinder axis L1.

In the same manner, at the second inlet slot $6_2a$, the line of intersection between the second plane Pa2 and the second orthogonal plane Pb2 inclines upwardly as it approaches from the position near the outer periphery of the combustion chamber 5 toward the first reference plane Pc1, and a line of intersection n2 between the second plane Pa2 including the second inlet slot $6_2a$ and the first orthogonal plane Pb1 (see FIG. 2) inclines upwardly from the position near the outer periphery of the combustion chamber 5 to the second reference plane Pc2. Therefore, the line of intersection n2 does not extent in parallel with the third reference plane Pc3.

Referring now to FIG. 1, in each combustion chamber 5, the pair of exhaust slots 7a are formed on a third plane Pa3, which is a plane coming into contact with the peripheral edge thereof along the entire circumference. The third plane Pa3 at each exhaust slot 7a is such that the line of intersection between the third plane Pa3 and the second orthogonal plane Pb2 inclines upwardly from the position near the outer periphery of the combustion chamber 5 toward the first reference plane Pc1. The line of intersection between the third plane Pa3 and the first orthogonal plane Pb1 is parallel with the third reference plane Pc3.

When a straight line extending orthogonally to the first plane Pa1 (an example is shown in FIG. 3) is assumed to be a perpendicular line L3, as shown in FIG. 3, each first port $6_1$ includes a port section $6_1c$ having a passage shape extending substantially along the perpendicular line L3 in a plan view from the first inlet slot $6_1a$ to the upstream by a predetermined passage length, that is, in this embodiment, by the length from the first inlet slot $6_1a$ toward the upstream to the position radially outward from the combustion chamber 5 in a plan view. Therefore, the port section $6_1c$ has a passage shape approaching gradually to the second port $6_2$ or the second reference plane Pc2 as it approaches to the first inlet slot $6_1a$ in a plan view. Thus, the center line of the passage at the port section $6_1c$ or the main stream of intake air flowing in the port section $6_1c$ extends along the perpendicular line L3. At the first inlet slot $6_1a$, the main stream of intake air is directed toward the position shifted toward the outer periphery of the combustion chamber 5 with respect to the cylinder axis L1 on the side of the second reference plane Pc2 where the first inlet slot $6_1a$ is located.

When a line extending orthogonally to the second plane Pa2 is assumed to be a perpendicular line L4 (an example is shown in FIG. 3), the second port $6_2$ extends linearly from the second inlet slot $6_2a$ toward the upstream and approaches gradually to the second reference plane Pc2 as it approaches to the upstream, while the perpendicular line L4 extending toward the upstream of the intake air gets away gradually from the second reference plane Pc2.

Referring to FIG. 1 and FIG. 2, the first and the second intake valves $8_1$, $8_2$ and the exhaust valve 9, each being formed of a poppet valve, include valve stems $8_1a$, $8_2a$, 9a to be slidably inserted into a valve guide 11 which is press-fitted and fixed to the cylinder head 2, and are supported respectively by the cylinder head 2 so as to be capable of reciprocating in the direction of the axes L5, L6, L7 of the valve stems $8_1a$, $8_2a$, 9a. The first intake valve $8_1$ is constantly urged in the valve-closing direction by a pair of valve springs 12, 13, and the second intake valve $8_2$ by a spring 14, and the respective exhaust valves 9 are constantly urged in the valve-closing direction by a pair of valve springs 15, 16.

Referring to FIG. 2, the first and the second intake valves $8_1$, $8_2$ disposed so as to be inclined with respect to the cylinder axis L1 when viewed in the direction of the rotational centerline A as shown in FIG. 1 are disposed so as to be inclined at the same angle with respect to the cylinder axis L1 when viewed in the direction orthogonal to the first reference plane Pc1 (hereinafter referred to as "orthogonal direction"). The axis L5 of the valve stem $8_1a$ of the first intake valve $8_1$ is either parallel or coincide with the perpendicular line L3, and the axis L6 of the valve stem $8_2a$ of the second intake valve $8_2$ is either parallel or coincide with the perpendicular line L4.

Referring also to FIG. 3, the first intake valve $8_1$ is disposed in such a manner that the axis (L5) of the valve stem ($8_1a$) approaches gradually to the second reference plane Pc2 as it approaches from the side of a distal end $8_1a1$ of the valve stem $8_1a$ toward the side of a bevel portion $8_1b$ of the first intake valve $8_1$ as viewed in a plan view. Therefore, a port section $6_1c$ has the passage shape extending substantially along the axis L5 of the valve stem $8_1a$ from the first inlet slot $6_1a$ toward the upstream by the predetermined passage length in plan view.

Disposed in a valve chamber 20 defined by the cylinder head 2 and the head cover 3 is a valve mechanism V for opening and closing the first and the second intake valves $8_1$, $8_2$ and the pair of exhaust valves 9 in each combustion chamber 5 at a predetermined timing according to the rotational position of the crankshaft. The valve mechanism V includes an intake camshaft 21 and an exhaust camshaft 22 constituting a pair of camshafts being rotatably supported by the cylinder head 2 and having a rotational centerline L2 parallel with each other. First and second intake cams 23, 24 constituting a pair of first and second intake valves $8_1$, $8_2$ being integral with the intake camshaft 21 and constituting valve motion cams for opening and closing the first and the second intake valves $8_1$, $8_2$, respectively. Exhaust cams 25 being integrated with the exhaust camshaft 22 and constitute valve motion cams for opening and closing the pair of exhaust valves 9. A first valve lifter 27 for transmitting a valve-opening force of the first intake cam 23 to the first intake valve $8_1$ by a sliding contact of the intake cam 23 and abutment against a distance adjusting shim 26 is capable of abutting against the distal end surface of the valve stem $48_1a$ of the first intake valve $8_1$. A second valve lifter 28 is capable of transmitting a valve-opening force of the second intake cam 24 to the second intake valve $8_2$ by a sliding contact of the second intake cam 24, a valve lifter 29 for transmitting a valve-opening force of the exhaust cam 25 by a sliding contact of the exhaust cam 25 and abutment against a distance adjusting shim 30 capable of abutting against the distal end of the valve stem of the exhaust valve 9. A valve halting mechanism 40 is provided for halting the opening and closing operation of the second intake valve $8_2$ in a specific operating range of the internal combustion engine E, for example, in the low-speed range of the revolving speed of the engine, or in the low-load operating range of the engine load.

The intake cam shaft 21 and the exhaust cam shaft 22 is interlocked with the crankshaft via a transmission mechanism having a timing chain and is rotated at half the speed thereof are rotatably supported by a plurality of lower bearings 2c integrally formed with the cylinder head 2 and upper bearings 40c formed on a unitary cam holder 40 combined to the cylinder head 2 with a bolt corresponding to the respective lower bearing 2c at the journals (a journal 21a of the intake cam shaft 21 is shown in FIG. 2).

Corresponding to the fact that the first and the second intake valves $8_1$, $8_2$ are inclined valves that incline with respect to the cylinder axis L1 when viewed in the orthogonal direction, each of the intake cams 23, 24 includes a cam surface inclining with respect to the rotational centerline L2. On the other hand, the exhaust cam 25 has a cam surface extending in parallel with the rotational centerline L2. The first and the second valve lifter 27, 28 having ceiling walls 27a, 28a to which the first and the second intake cams 23, 24 come into sliding contact, and the valve lifer 29 having a ceiling wall 29a to which the exhaust cam 25 comes into sliding contact fit into supporting boars 32a, 33a, 34a of supporting portions 32, 33, 34 formed integrally with the cylinder head 2 so as to be capable of reciprocating motion. The first intake valve $8_1$ and the exhaust valve 9 are constantly opened and closed by the valve mechanism V when the internal combustion engine E is in operation.

Provided in each combustion chamber 5 between the second valve lifter 28 and the second intake valve $8_2$ is the valve halting mechanism 40 for switching transmission and non-transmission of the valve opening force from the second valve lifter 28 which reciprocates by being pressed by the rotating second intake cam 24 to the second intake valve $8_2$. Each valve halting mechanism 40, being controlled by a drive mechanism 50 that will be described later, halts the opening and closing operation of the second intake valve $8_2$ irrespective of the reciprocating motion of the second valve lifter 28 in the specific operating range of the internal combustion engine E, for example, in the low-speed operating range or the low-load operating range, and maintains the second intake valve $8_2$ in the closed state.

Figure 4:
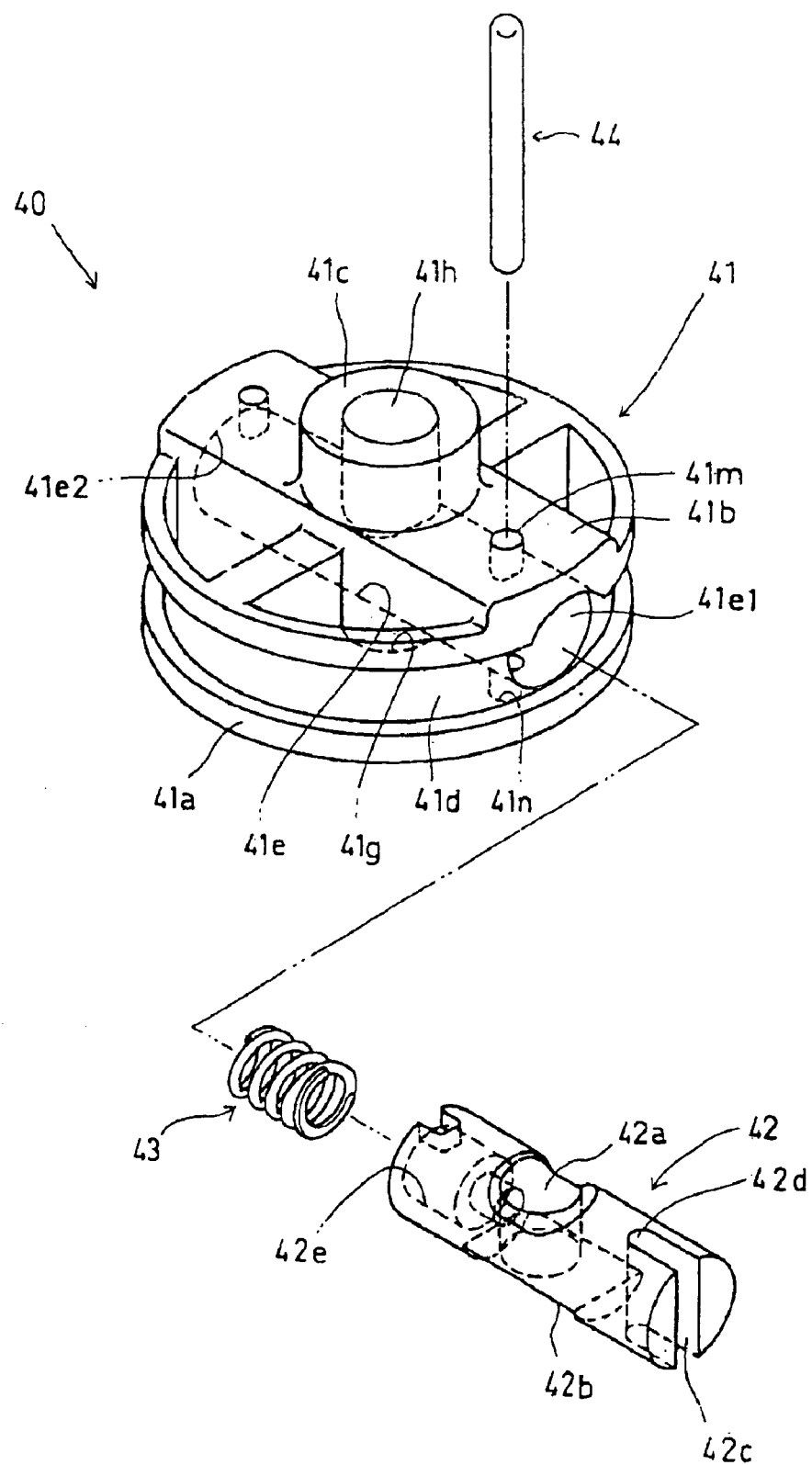
FIG. 4 is an exploded perspective view of a valve halting mechanism of the internal combustion engine in FIG. 1.

Referring to FIG. 1, FIG. 2, and FIG. 4, the valve halting mechanism 40 includes a cylindrical pin holder 41 to be slidably fitted in the second valve lifter 28, a slide pin 42 to be slidably fitted in the pin holder 41, a return spring 43 for urging the reciprocating slide pin 42 by a hydraulic pressure of hydraulic oil, and a stopper pin 44 for preventing axial rotation of the slide pin 42.

The pin holder 41 is a member including a ring portion 41a having an outer periphery which comes into surface contact with the inner periphery of the second valve lifter 28, a connecting portion 41b connecting the ring portion 41a in the direction of the diameter, and an abutting portion 41c projecting upwardly from the center of the connecting portion 41b to abut against the ceiling wall 28a of the second valve lifter 28 formed integrally with each other. An annular groove 41d is formed as an oil passage along the entire circumference on the outer periphery of the ring portion 41a. The connecting portion 41b is formed with a bottomed storage hole 41e having an open end 41e1 having an axis orthogonal to the axis of the second valve lifter 28 and opening toward the annular groove 41d and a closed end 41e2 closed by a bottom wall 41f. A fitting hole 41g is provided to which a distal end $8_2a1$ of the valve stem $8_2a$ of the second intake valve $8_2$ is fitted and opening toward the storage hole 41e at the upper end. The abutting portion 41c is formed with a through-hole 41h which receives the distal end $8_2a1$ of the valve stem $8_2a$ of the second intake valve $8_2$ therethrough with an axis coinciding with the axis of the pin holder 41 and opens toward the storage hole 41e at the lower end thereof.

The pin holder 41 having the slide pin 42 fitted into the storage hole 41e is formed with a hydraulic chamber 45 in communication with the annular groove 41d between the slide pin 42 and the second valve lifter 28 on the side of the open end 41e1. A spring chamber 46 is provided for accommodating the return spring 43 for urging the slide pin 42 in the direction of reducing the volume of the hydraulic chamber 45 between a recess 42e and the bottom wall 41f on the side of the closed end 41e2.

A spring 17 disposed so as to surround the valve spring 14 brings the abutting portion 41c of the pin holder 41 into abutment against the valve lifter 28, and urges the second valve lifter 28 so that the ceiling wall 28a of the second valve lifter 28 comes into contact with the second intake cam 24 via the pin holder 41. In addition, an annular groove 47 is formed as an oil passage along the entire circumference of the inner periphery of the supporting portion 33 to which the second valve lifter 28 is fitted, and the annular groove 47 is constantly in communication with the annular groove 41d of the pin holder 41 via a communication hole 28b formed on the side wall of the second valve lifter 28.

At the midsection of the slide pin 42 in the axial direction, there is formed a through-hole 42a for receiving the distal end $8_2a1$ of the valve stem $8_2a$ of the second intake valve $8_2$ so as to penetrate therethrough and being capable of continuing coaxially with the fitting hole 41g and the through-hole 41h. The through-hole 42a opens on a flat abutting surface 42b formed on the outer periphery of the slide pin 42 so as to oppose the fitting hole 41g on the side of the fitting hole 41g. The abutting surface 42b is formed along the axis of the slide pin 42 so as to be longer than the diameter of the through hole 42a, and the through-hole 42a opens on the abutting surface 42b at the position closer to the return spring 43.

The slide pin 42 moves in the axial direction according to the magnitude of the drive force exerted to one end of the slide pin 42 by the hydraulic pressure in the hydraulic chamber 45 and a spring force exerted on the other end of the sliding pin 42 by the return spring 43. When the hydraulic pressure in the hydraulic chamber 45 to which the hydraulic oil is supplied is reduced to a low pressure, the slide pin 42 takes a halting position shown in FIG. 2, in which the distal end $8_2a1$ of the valve stem $8_2a$ fitted into the fitting hole 41g can be inserted through the through-hole 42a and the through-hole 41h by a spring force of the return spring 43. When the hydraulic pressure in the hydraulic chamber 45 is increased into a high pressure, the slide pin 42 takes an operating position moved toward the right in FIG. 2, in which the through-hole 42a is displaced from the fitting hole 41g and the through-hole 41h by a drive force exerted by the hydraulic pressure and the distal end $8_2a1$ of the valve stem $8_2a$ abuts against the abutting surface 42b.

When the slide pin 42 takes the halting position, the pin holder 41 and the slide pin 42 are moved toward the second intake valve $8_2$ together with the second valve lifter 28 according to the sliding movement of the second valve lifter 28 by a valve-opening force exerted from the second intake cam 24. However, since the distal end $8_2a1$ of the valve stem $8_2a$ enters into the through-hole 42a and the through-hole 41h, the valve-opening force of the second intake cam 24 does not act on the second intake valve $8_2$. Thus, the second intake valve $8_2$ is halted in the valve-closed state. When the slide pin 42 takes the operating position, the distal end $8_2a1$ of the valve stem $8_2a$ abuts against the abutting surface 42b of the slide pin 42, and the valve-opening force of the second intake cam 24 is transmitted to the second intake valve $8_2$ via the second valve lifter 28, the pin holder 41 and the slide pin 42. Therefore, the second intake valve $8_2$ opens and closes in accordance with the rotation of the second intake cam 24.

The stopper pin 44 is press fitted into a pair of mounting holes 41m, 41n formed on the pin holder 41 on the side of the opening end 41e1 of the storage hole 41e and passes through a slit 42c formed so as to open toward the hydraulic chamber 45. Therefore, the stopper pin 44 passed through the slit 42c allows axial movement of the slide pin 42, and defines the amount of maximum movement of the slide pin 42 toward the hydraulic chamber 45 by coming into abutment against a bottom wall surface 42d of the slit 42c.

A drive mechanism 50 for moving the slide pin 42 of the valve halting mechanism 40 is of a hydraulically operated type using lubricant discharged from an oil pump driven by the power of the crankshaft as hydraulic oil, and includes an oil passage 51 formed in the cylinder head 2 so as to communicate with the annular groove 47. A hydraulic control valve 52 is provided for controlling the hydraulic pressure of the hydraulic oil supplied from the oil pump. A control unit 53 is provided for controlling the operation of the hydraulic control valve 52 in accordance with the revolving speed of the engine or the engine load, which define the engine operating state. The hydraulic control valve 52 controls the hydraulic pressure of hydraulic oil flowing in the oil passage 51 upon reception of instruction from the control unit 53 so that the oil pressure in the hydraulic chamber 45 is decreased to a low pressure in the above-described specific operating range of the internal combustion engine E, and the oil pressure in the hydraulic chamber 45 is increased to a high pressure in other operating ranges.

Subsequently, the operation and the effect of the embodiment in the arrangement described above will be described.

When the internal combustion engine E is operated in a specific operating range, the slide pin 42 of the valve halting mechanism 40 takes the halting position. Therefore, the second intake valve $8_2$ is brought into the halting state and thus only the first intake valve $8_1$ opens and closes. Accordingly, intake air flowing through the intake port 6 during the intake stroke passes through the first port $6_1$ and flows into the combustion chamber 5 only through the first inlet slot $6_1a$. Thereafter, since the main flow of intake air is directed to the position shifted toward the outer periphery of the combustion chamber 5 with respect to the cylinder axis L1 at the first inlet slot $6_1a$, a swirl S (see FIG. 3) is generated in the combustion chamber 5 by intake air flowing through the first inlet slot $6_1a$.

Therefore, the valve halting mechanism 40 constitutes intake air control means for generating the swirl S in the combustion chamber 5 by intake air flowing through the first port $6_1$. In other words, the intake air control means is means for generating the swirl S in the combustion chamber 5 by intake air flowing through the first port $6_1$ so that intake air is not flowing substantially into the combustion chamber 5 through the second inlet slot $6_2a$. Here, the phrase "is not flowing substantially into the combustion chamber 5 through the second inlet slot $6_2a$" means that intake air to the extent that it hardly affects the generation of the swirl S may be flowing into the combustion chamber 5 through the second inlet slot $6_2a$, for example, by slightly opening the second intake valve $8_2$ for preventing fuel from being retained on the second intake valve $8_2$ in addition to the case in which the second intake valve $8_2$ is closed. Thus, intake air is not flowing through the second inlet slot $6_2a$ as described above.

Since the slide pin 42 of the valve halting mechanism 40 takes the operating position described above when the internal combustion engine E is operated in the operating range other than the specific operating range described above, for example, in the high-speed operating range or the high-load operating range, the second intake valve $8_2$ is opened and closed by the second intake cam 24 via the valve halting mechanism 40. Thus, the intake air is flowing into the combustion chamber 5 from the first and the second port $6_1$, $6_2$. Therefore, the swirl S is not generated and the intake air is flowing into the combustion chamber 5 from the first and the second port $6_1$, $6_2$ in the operating range in which a large amount of intake air is flowing, and thus high output may be generated.

In this manner, when the second intake valve $8_2$ which is brought into the halting state by the valve halting mechanism 40 closes the second port $6_2$ and the swirl S is generated by intake air flowing through the first port $6_1$ into the combustion chamber 5, the line of intersection n1 between the first plane Pa1 and the first orthogonal plane Pb1 inclines upwardly as it approaches from the position near the outer periphery of the combustion chamber 5 to the second reference plane Pc2 at the first inlet slot $6_1a$, and the first port $6_1$ includes the port section $6_1c$ having the passage shape extending substantially along the perpendicular line L3 in a plan view by the length from the first inlet slot $6_1a$ toward the upstream to the position radially outwardly from the combustion chamber 5 in a plan view. Therefore, at the first inlet slot $6_1a$, the first plane Pa1 assumes a bevel inclining upwardly as it approaches from the position near the outer periphery of the combustion chamber 5 to the second reference plane Pc2, and the line of intersection n1 is not parallel with the third reference plane Pc3. In other words, the first inlet slot $6_1a$ is opened and closed by the first intake valve $8_1$ formed of a poppet valve and is included in the first plane Pa1, which is a bevel inclining upwardly as it approaches from the position near the outer periphery of the combustion chamber 5 to the second reference plane Pc2 in the direction of rotational centerline A. Therefore, in comparison with the related art, the diameter of the first inlet slot $6_1a$ may be increased in the direction of the rotational centerline A and thus the opening area of the first inlet slot $6_1a$ can be increased. In addition, the port section $6_1c$ of the first port $6_1$ is a passage extending in the direction orthogonal to the first inlet slot $6_1a$ in a plan view, or a passage extending in the direction substantially orthogonal to the first inlet slot $6_1a$ in a plan view. Consequently, the width of the passage in a plan view which is a factor for determining the cross-sectional area at the port section $6_1c$ extending from the first inlet slot $6_1a$ to the upstream (the area of the passage along a plane orthogonal to the streamline of intake air) can be maximized.

Consequently, in a simple structure, the opening area of the first inlet slot $6_1a$ may be increased and the width of the passage of the port section $6_1c$ in a plan view may be substantially maximized to increase the cross section of the passage. Therefore, when the valve halting mechanism 40 generates the swirl S in the combustion chamber 5 by intake air flowing through the first port $6_1$ by halting the second intake valve $8_2$, the amount of intake air for generating the swirl flowing from the first inlet slot $6_1a$ into the combustion chamber 5 can be increased, and thus a strong swirl S can be generate. Consequently, the combustibility in a lean-burn operation is further improved, and thus the combustion with a leaner air-fuel mixture is realized, which contributes to a decrease in fuel consumption. In addition, nevertheless a strong swirl S is generated with intake air flowing into the combustion chamber 5 when generating the swirl is prevented from being squeezed. Thus, the pumping loss can be reduced, which also contributes to a decrease in fuel consumption.

Another embodiment in which part of the structure of the above-described embodiment is modified will be described below in conjunction with the modified structure.

The intake air control means in the above-described embodiment is the valve halting mechanism 40 provided in the second valve lifer 28. However, a valve halting mechanism provided on a member other than the valve lifter, for example, a valve halting mechanism having a halting cam formed into a substantially basic circle may also be employed. The intake air control means may be composed of a control valve provided at the second port $6_2$ which is located on the upstream side of the second intake valve $8_2$ and capable of closing the second port $6_2$, or of a control valve provided in the intake passage of the air intake unit for preventing intake air from flowing into the second port $6_2$.

The intake port may have three ports having three inlet slots opened and closed by three intake valves, respectively. In this case, the present invention is applied using the port which generates the swirl as the first port. As an embodiment of the present invention, the intake valve and the exhaust valve may be of valves other than the poppet valve.

The internal combustion engine may be mounted to vehicles other than motorcycles or to machines. The present invention is not limited to a four-cylinder engine, but may be a multi-cylinder internal combustion engine or a single-cylinder internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
    a cylinder in which a piston is reciprocably fitted, the cylinder having a cylinder axis;
    a cylinder head formed with an intake port having a first port and a second port including, respectively, a first inlet slot and a second inlet slot opening into a combustion chamber;
    a valve mechanism for opening and closing a first intake valve and a second intake valve for opening and closing the first port and the second port, respectively, the first valve and the second valve each having a longitudinal axis; and
    intake air control means for generating a swirl in the combustion chamber by intake air flowing from the first port; and
    a camshaft provided with a valve motion cam for opening and closing the first intake valve, the camshaft having a rotational centerline perpendicular the cylinder axis,
    wherein a perpendicular line orthogonal to a first plane, which is a plane including the first inlet slot, the perpendicular line being either parallel to or coincident with the longitudinal axis of the first intake valve,
    that a plane including the cylinder axis and extending in parallel with the rotational centerline of the camshaft is a first reference plane,
    that a plane including the cylinder axis and extending orthogonally to the rotational centerline is a second reference plane, and
    that a plane extending in parallel with the first reference plan is a first orthogonal plane,
    that a line of intersection n1 between the first plane which includes the first inlet slot and the first orthogonal plane inclines upwardly as it approaches from a position near an outer periphery of the combustion chamber toward the second reference plane, wherein the first port includes a first port section having a passage shape which extends substantially along the perpendicular line from the first inlet slot in an upstream direction by a predetermined length of the first port in a plan view, and wherein the first port section having the passage shape has a cross section which gradually and smoothly increases in size as it extends from the first inlet slot in the upstream direction.

2. The internal combustion engine according to claim 1, wherein the first port that includes the first port section extends a length from the first inlet slot towards the upstream to a position radially outward from the combustion chamber in a plan view.

3. The internal combustion engine according to claim 2, wherein the first port section has a passage shape approaching gradually to the second port as it approaches to the first inlet slot.

4. The internal combustion engine according to claim 3, wherein at the first inlet slot a main stream of intake air is directed toward a position shifted toward the outer periphery of the combustion chamber with respect to where the first inlet slot is located.

5. The internal combustion engine according to claim 1, and further including a valve halting mechanism operatively positioned relative to the second intake valve for switching transmission and non-transmission of a valve opening force from a second valve lifter to the second intake valve.

6. The internal combustion engine according to claim 5, and further including a drive mechanism for controlling the halting mechanism for selectively halting the opening and closing operation of the second intake valve irrespective of a reciprocating motion of a second valve lifter in a specified operating range of the internal combustion engine.

7. The internal combustion engine according to claim 6, wherein the drive mechanism is operated to halt the opening and closing operation of the second intake valve in a low-speed operating range.

8. The internal combustion engine according to claim 6, wherein the drive mechanism is operated to halt the opening and closing operation of the second intake valve in a low-load operating range.

9. The internal combustion engine according to claim 5, wherein the valve halting mechanism includes a cylindrical pin holder slidably fitted in a second valve lifter with a slide pin slidably fitted in the pin holder and a return spring for urging the slide pin in a predetermined direction.

10. The internal combustion engine according to claim 9, and further including a stopper pin operatively positioned relative to said slide pin for preventing rotation of the slide pin.

11. The internal combustion engine according to claim 1, wherein the first port section has a cross section which is substantially circular in shape, the circular-shaped cross section gradually and smoothly increases in size as the first port section extends from the first inlet slot in the upstream direction.

12. The internal combustion engine according to claim 10, wherein the port section has a cross section which is substantially circular in shape, the circular-shaped cross section gradually and smoothly increases in size as the port section extends from the first inlet slot in the upstream direction.

13. An internal combustion engine comprising:

an internal combustion engine including a cylinder in which a piston is reciprocably fitted, the cylinder having a cylinder axis;

a cylinder head formed with an intake port having a first port and a second port including, respectively, a first inlet slot and a second inlet slot opening into a combustion chamber;

a first intake valve and a second intake valve formed as poppet valves for opening and closing the first inlet slot and the second inlet slot, respectively, the first intake valve and the second intake valve each having a valve stem and a bevel portion;

a valve mechanism for opening and closing the first intake valve and the second intake valve, and for halting the second intake valve in a specified operating range;

a camshaft provided with a valve motion cam for opening and closing the first intake valve, wherein the first intake valve is disposed so as to gradually approach a reference plane which includes the cylinder axis and extends orthogonally to a rotational centerline of the camshaft as an axis of the valve stem approaches from a side of a distal end of the valve stem to a side of the bevel portion of the first intake valve in plan view;

wherein the first port includes a port section having a passage shape extending substantially along the axis of the valve stem in a plan view from the first inlet slot in an upstream direction by a predetermined passage length, and wherein the port section having the passage shape has a cross section which gradually and smoothly increases in size as it extends from the first inlet slot in the upstream direction.

14. The internal combustion engine according to claim 13, wherein the valve mechanism includes a valve halting mechanism operatively positioned relative to the second intake valve for switching transmission and non-transmission of a valve opening force from a second valve lifter to the second intake valve.

15. The internal combustion engine according to claim 14, and further including a drive mechanism for controlling the halting mechanism for selectively halting the opening and closing operation of the second intake valve irrespective of a reciprocating motion of a second valve lifter in the specified operating range of the internal combustion engine.

16. The internal combustion engine according to claim 15, wherein the drive mechanism is operated to halt the opening and closing operation of the second intake valve in a low-speed operating range.

17. The internal combustion engine according to claim 15, wherein the drive mechanism is operated to halt the opening and closing operation of the second intake valve in a low-load operating range.

18. The internal combustion engine according to claim 14, wherein the valve halting mechanism includes a cylindrical pin holder slidably fitted in a second valve lifter with a slide pin slidably fitted in the pin holder and a return spring for urging the slide pin in a predetermined direction.

19. The internal combustion engine according to claim 18, and further including a stopper pin operatively positioned relative to said slide pin for preventing rotation of the slide pin.

* * * * *